United States Patent [19]
Braunstein

[11] 3,857,068
[45] Dec. 24, 1974

[54] TRANSFORMER HAVING A THYRISTOR CONTROLLED CIRCUIT BREAKER

[75] Inventor: Harry R. Braunstein, Athens, Ga.

[73] Assignee: Westinghouse Electric Corporation, Pittsburgh, Pa.

[22] Filed: Sept. 26, 1973

[21] Appl. No.: 401,095

[52] U.S. Cl. .................................... 317/15, 317/41
[51] Int. Cl. ............................................ H02h 7/04
[58] Field of Search............ 317/14 H, 14 J, 15, 41, 317/42; 340/228 R, 216

[56] References Cited
UNITED STATES PATENTS

| | | | |
|---|---|---|---|
| 2,956,210 | 10/1960 | Yatsushiro | 317/4 CA X |
| 3,479,563 | 11/1969 | Roy | 317/15 |
| 3,585,450 | 6/1971 | Lane | 317/15 X |
| 3,675,081 | 7/1972 | Earing | 317/15 |
| 3,691,425 | 9/1972 | Weyrich et al. | 317/15 |

*Primary Examiner*—G. Harris
*Attorney, Agent, or Firm*—J. R. Hanway

[57] ABSTRACT

A transformer having a protective device responsive directly to the temperature of the winding structure. An electrical, temperature responsive sensing element is located within the winding structure and is connected to a thyristor control circuit. The sensing element triggers the thyristor when the sensed temperature exceeds a predetermined value. The thyristor energizes a solenoid which trips the contacts of a circuit breaker. Another sensing element trips another thyristor when the sensed temperature exceeds another predetermined value to activate an overload indicator which remains activated even if the sensed temperature decreases below the predetermined value.

12 Claims, 6 Drawing Figures

Fig. 2
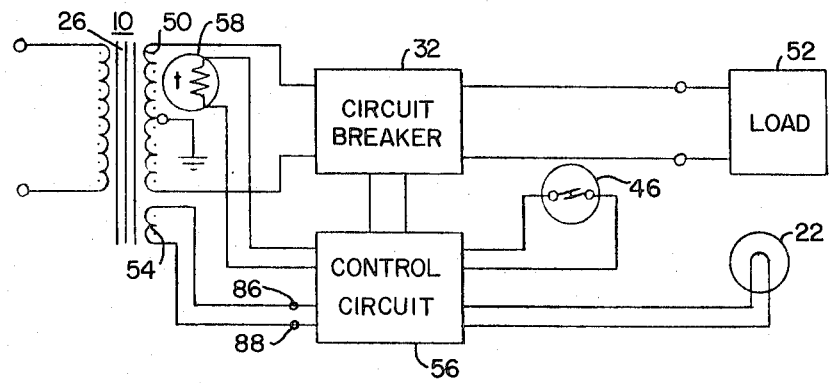
Fig. 4
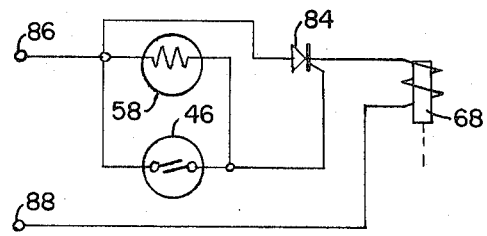
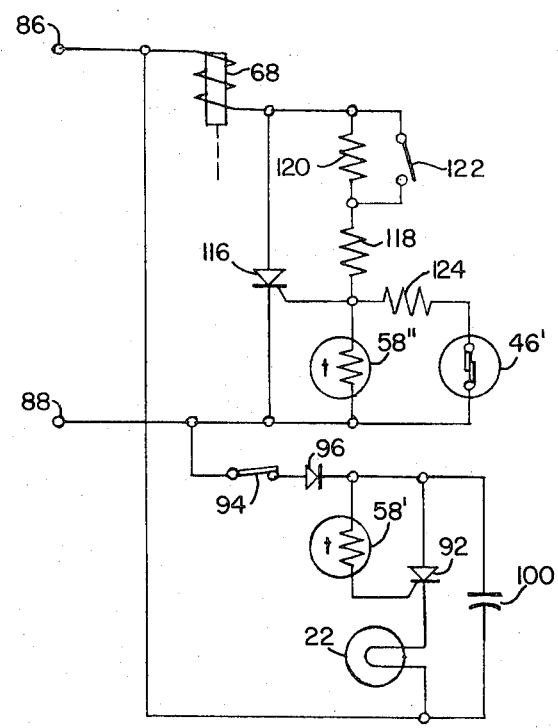
Fig. 5

TRANSFORMER HAVING A THYRISTOR CONTROLLED CIRCUIT BREAKER

BACKGROUND OF THE INVENTION

1. Field of the Invention

This invention relates, in general, to electrical inductive apparatus and, more specifically, to transformers having circuit breaker protective devices.

2. DESCRIPTION OF THE PRIOR ART

Self-protected distribution transformers contain dual-contact circuit breakers which disconnect the secondary winding of the transformer from the load when the transformer is dangerously overloaded. Such transformers may have overload indicators or signal lights which are turned on when the transformer is moderately overloaded and which remain on even if the load returns to normal. Control of the circuit breaker and the signal light is accomplished conventionally by the use of a bimetallic strip through which the load current flows. Such control means presents several inherent disadvantages.

Since a bimetallic strip operates on a mechanical movement principle, it cannot be both located within the transformer winding structure and conveniently coupled to the circuit breaker contacts. In effect, the bimetallic strip in conventional arrangements is largely dependent upon the current flowing therethrough to determine when the transformer is overloaded. This is only an approximation of the true overload condition since the determining factor is the temperature of the winding conductors and insulation structure. Therefore, it is desirable, and it is an object of this invention, to provide a transformer having a circuit breaker which is conveniently and directly controlled by the temperature of the winding structure.

The rating of a circuit breaker, that is, the amount of load permitted thereby, is determined within a reasonable range by the physical components which trip the breaker contacts. Changing the size, shape, position, or forces on the components changes the breaker rating. Since the movement of a bimetallic strip is relatively small, the tolerances within which the components must be maintained is relatively small. Manufacturing techniques require that every breaker must be individually calibrated to provide the desired rating. Therefore, it is also desirable, and it is a further object of this invention, to provide a transformer having a circuit breaker which is controlled by components which can be manufactured and assembled with a close tolerance to reduce the need for calibrating each unit individually.

The rating of a conventional circuit breaker may be changed over a limited range usually by making mechanical adjustments to the bimetallic strip or to other associated components. If the rating is to be changed substantially, it is usually necessary to replace the bimetallic strip with another strip. Such changes in rating require additional expenses when performed in the factory or in the field. Therefore, it is also desirable, and it is a further object of this invention, to provide a transformer having a circuit breaker which is constructed for quick and convenient changing of the breaker rating.

SUMMARY OF THE INVENTION

There is disclosed herein a new and useful transformer combination having a thyristor controlled circuit breaker. An electrical, temperature sensing element is located directly in the winding structure of the transformer and is connected to the gating circuit of a thyristor. When the sensed temperature exceeds a predetermined value, the thyristor is triggered and a solenoid is energized by current flowing through the thyristor. The solenoid is connected to a trip arm located in the circuit breaker enclosure and causes the breaker contacts to open when the solenoid is energized. A magnetic reed switch is located in the magnetic field of the transformer load current. The reed switch also triggers the thyristor when the magnetic field is sufficient to close the contacts of the reed switch.

Another electrical temperature sensing element is located within the winding structure of the transformer and is connected to the gating circuit of another thyristor. When the temperature detected by this sensing element exceeds a predetermined value, the thyristor is triggered and turns a signal light on. A non-alternating voltage circuit arrangement is used in the supply voltage section to provide a continuous current through the thyristor to prevent the turning off of the signal light when the sensed temperature decreases below the predetermined value.

The solenoid energizing circuitry may be conveniently assembled on a separate plug-in board or module, thus changing the rating of the circuit breaker may be accomplished by plugging in a new circuit. Since the electrical components may be manufactured to closer tolerances, the rating of the circuit breaker is within a closer tolerance then mechanically tripped circuit breakers.

BRIEF DESCRIPTION OF THE DRAWING

Further advantages and uses of this invention will become more apparent when considered in view of the following detailed description and drawing, in which:

FIG. 2 is a schematic diagram of the transformer shown in FIG. 1;

FIG. 4 is a schematic diagram of a control circuit for tripping the circuit breaker;

FIG. 5 is a schematic diagram of a control circuit for tripping the circuit breaker and for activating an overload indicator.

DESCRIPTION OF THE PREFERRED EMBODIMENTS

Figure 1:
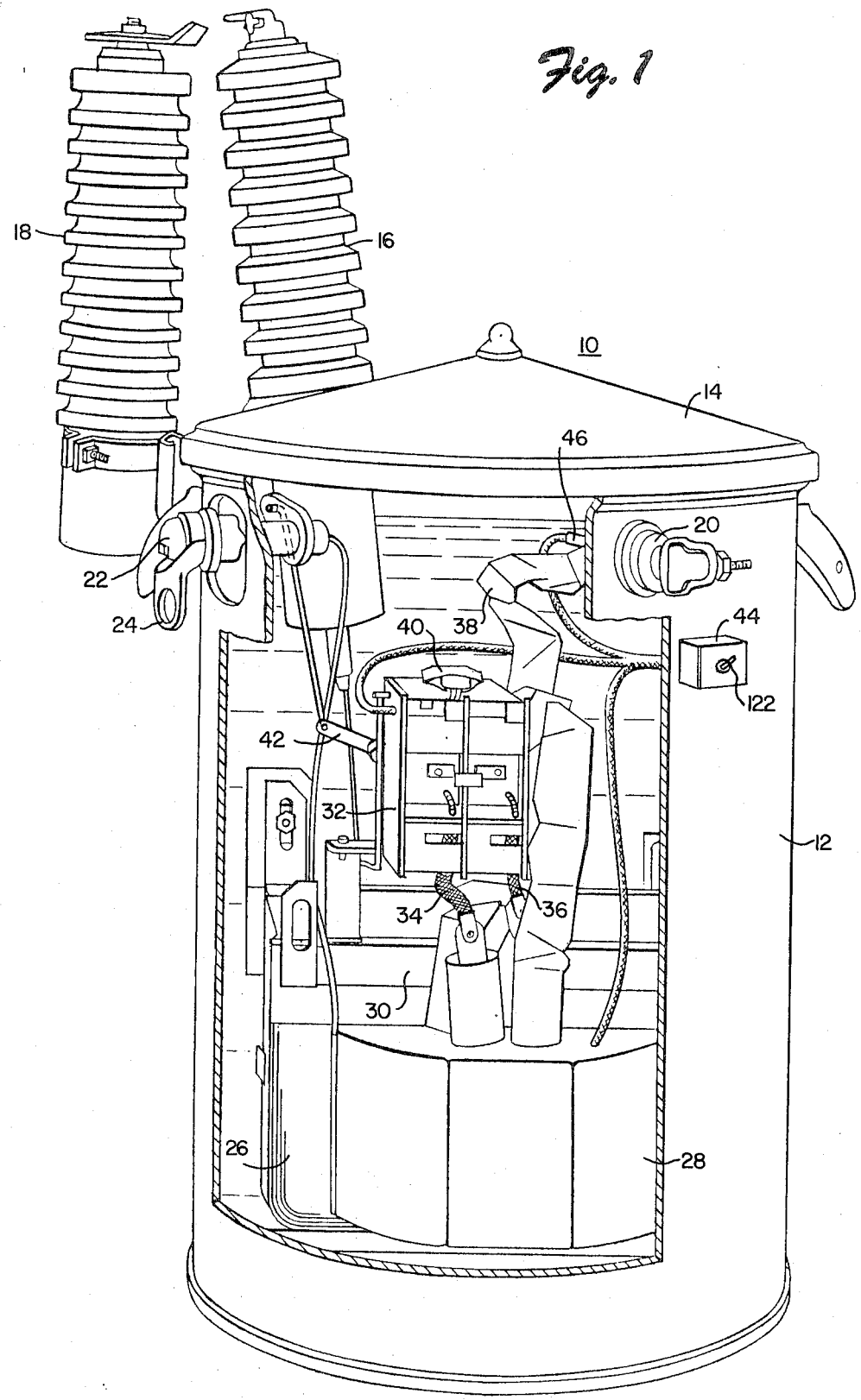
FIG. 1 is a cutaway view of a distribution transformer constructed according to this invention.

Throughout the following description, similar reference characters refer to similar elements or members in all the figures of the drawing.

Referring now to the drawing, and to FIG. 1 in particular, there is shown a pole-type distribution transformer 10. The transformer tank 12 and the cover 14 support the high-voltage bushing 16, the lightning arrester 18, and the low-voltage bushings, such as the bushing 20. A signal light 22 and a reset lever 24 are located on the outside of the tank 12.

A magnetic core 26 and a winding assembly 28 are contained within the tank 12. The frame structure 30, which is positioned around the core 26, supports the circuit breaker 32. In this specific embodiment, the circuit breaker 32 includes a dual-contact assembly to which the low-voltage secondary leads 34 and 36 are attached. Current flowing through the leads 34 and 36 flows through the circuit breaker contacts and through the bushing lead 38 and the bushing lead 40, which is partially illustrated in the interest of clarity.

The circuit breaker 32 may be manually opened or closed by moving the lever 24 which moves the arm 42 and the contact handles which are in the back of the circuit breaker 32 as shown in FIG. 1. The enclosure 44 contains electronic circuits which control the operation of the signal light 22 and the circuit breaker contacts. The control circuits are activated by thermally responsive, electrical elements located within the winding assembly and by the magnetic reed switch 46 which is located in the magnetic field produced by current flowing through the lead 38. The enclosure and its contents may be located at various other positions in or on the transformer 10 without departing from the scope of this invention.

FIG. 2 is a schematic diagram of the transformer shown in FIG. 1. The secondary winding 50 is connected through the circuit breaker 32 to the load 52. The tertiary winding 54 supplies power to the control circuit 56. The temperature sensor 58 and a magnetically responsive device, such as the magnetic reed switch 46, provide the signals which determine the operation of the control circuit 56. The control circuit is capable of tripping the circuit breaker 32 and/or lighting the signal light 22. With one of the control circuits described in detail herein, two temperature sensors, such as the sensor 58, would be used to provide control for both the circuit breaker 32 and the signal light 22.

The temperature sensor 58 by be a temperaure responsive variable resistance element, such as a thermistor which has a negative temperature coefficient; a thermocouple; or any other suitable element. A barium-titanate resistor which has a positive temperature coefficient may also be used. The sensor 58 is illustrated at a position located within the structure of the winding assembly. With this arrangement, the heat sensor 58 actually senses the temperature of the critical components, that is, the winding conductors and insulation. It is within the contemplation of this invention that the temperature sensor 58 could be located at other positions in the transformer, such as in the oil dielectric or adjacent to a winding lead.

Figure 6:
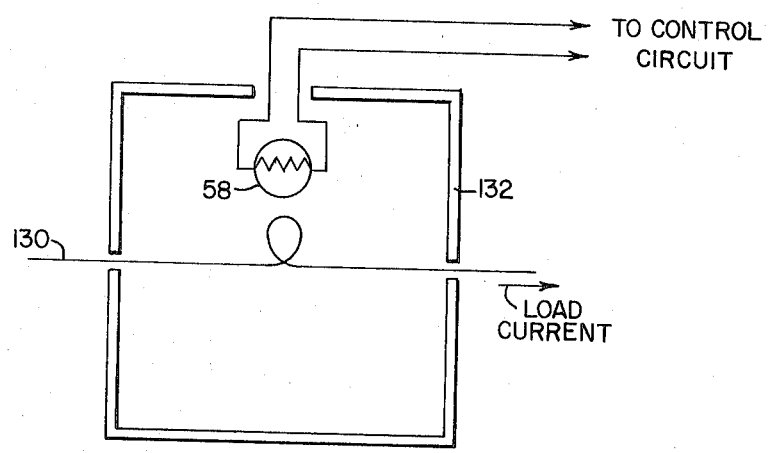
FIG. 6 is a schematic diagram of a winding analog arrangement suitable for use with this invention.

FIG. 6 illustrates a winding analog arrangement which may be used. The sensor 58 is located near the lead 130 which carries the load current. The heat trap 132 has a heat time constant which is equal to that of the winding assembly 28. With this arrangement, the temperature sensor 58 is responsive to the temperature of the winding assembly without being physically located therein.

Figure 3:
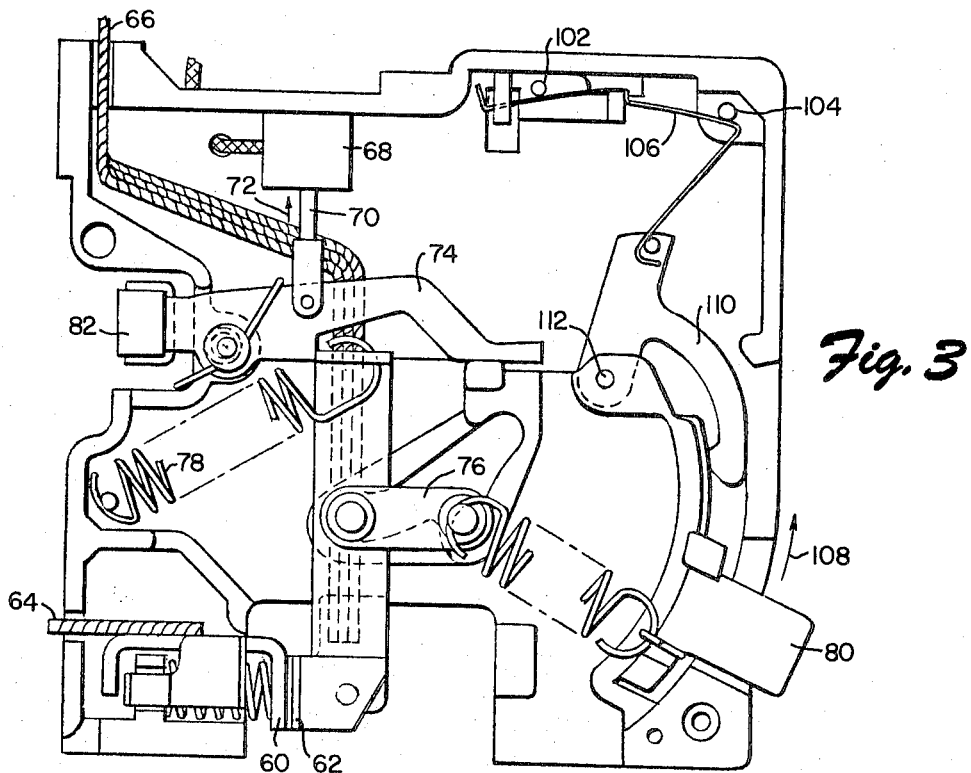
FIG. 3 is a view of a circuit breaker section constructed according to this invention.

When the sensed temperature exceeds a predetermined value, the control circuit 56 sends an electrical signal to the circuit breaker 32 which trips, or opens, the circuit breaker contacts. FIG. 3 is a view of a circuit breaker which may be opened by the application of an electrical control signal. Only one section of the circuit breaker is shown in FIG. 3. The complete circuit breaker 32 consists of the section shown in FIG. 3 and a substantially similar section attached thereto. U.S. Pat. No. 2,686,242, which is assigned to the assignee of this invention, describes, in detail, the operation of a circuit breaker constructed similar to the circuit breaker of this invention, except that the control is provided by a bimetallic strip contained within the circuit breaker.

As shown in FIG. 3, the contacts 60 and 62 are in the closed position and permit current flow through the leads 64 and 66. To trip the breaker contacts, the electrical signal from the control circuit energizes the solenoid 68. When the solenoid 68 is energized, the plunger 70 moves in the direction 72 to lift the arm 74. As described in U.S. Pat. No. 2,686,242, raising the arm 74 allows the contact assembly 76 to disengage the contacts 60 and 62 with the force provided by the spring 78. Raising the handle 80 and then lowering it to the position shown will reset the breaker and engage the contacts 60 and 62. The adjacent section of the circuit breaker which contains the other set of contacts would not require a separate solenoid since the arm 74 of the section illustrated in FIG. 3 is connected to a similar arm in the adjacent section by the bar 82.

FIG. 4 is a schematic diagram of a basic control circuit which may be used to activate the solenoid 68. The thyristor 84 normally blocks the flow of current through the terminals 86 and 88 and through the solenoid 68. When the sensed temperature exceeds a predetermined value, the resistance of the thermistor 58 decreases to a value which triggers the gate of the thristor 84 to turn the thristor on. Thus, current flows through the thyristor 84 and energizes the solenoid 68. When the magnetic field in the vicinity of the reed switch 46 is sufficient, the switch 46 closes to turn the thyristor 84 on and energize the solenoid 68.

FIG. 5 is a schematic diagram of a control circuit which activates the solenoid 68 in the circuit breaker 32 and the signal light 22. The thermistor 58'' is located at a suitable location in the transformer, such as within the winding assembly. The sensor 58'' may be located at the same position as the sensor 58''. The sensor 58'' may be a positive temperature coefficient variable resistor, such as one constructed of barium-titanate. The sensor 58' may have a negative temperature coefficient. When the sensed temperature exceeds a first predetermined magnitude, the resistance of the sensor 58' is sufficiently low enough to trigger the thyristor 92. The signal light 22 is turned on since the switch 94 is normally in the closed position.

Typical signal light operation requires that the light remain on even when the sensed temperature, which is a measure of the overload, has been lowered. The circuit of FIG. 5 provides this operation by providing a source of voltage which maintains a flow of current through the thyristor 92 during current nodes within the alternating current cycle. This is required since the thyristor 92 would be turned off if the current flowing therethrough becomes zero for any instant of time, and the sensor 58' has increased in resistance above the triggering value. The diode 96 provides direct current to the thyristor 92, and to the capacitor 100. The capacitor 100 maintains the desired current during the half cycle of the input voltage which does not produce current flow through the diode 96.

The switch 94 may be used to reset the signal light 22. Momentarily opening the switch 94 for a few cycles allows the current through the thyristor 92 to decay to zero, thus turning off the thyristor 92. The switch 94 may be provided conveniently by the contacts 102 and 104 as shown in FIG. 3. The metallic spring 106 electrically connects the contacts 102 and 104 together when the contact handle 80 is in the position illustrated. When it is desired to reset the signal light 22, the handle 80 is moved in the direction 108 until the member 110 is rotated sufficiently around the pin 112 to pull the spring 106 away from the contact 104. This breaks the electrical connection between the contacts 102 and 104 and effectively turns the signal light 22 off. This is accomplished without opening the main contacts 60 and 62 since the handle 80 must be raised farther to trip the breaker than to reset the signal light.

The thyristor 116, as shown in FIG. 5, provides another switching circuit which controls the activation of the solenoid 68. The values of the resistors 118 and 120 are selected to provide the proper gating current when the temperature sensed by the sensor 58″ exceeds a predetermined value. When the switch 122 is open, the triggering point corresponds to a first predetermined temperature. When the switch 122 is closed, the triggering point corresponds to a second predetermined temperature. The switch 122 provides "emergency control" of the circuit breaker, thus allowing operation of the transformer at temperature levels above the normal limit.

The resistor 124 and the normally closed reed switch 46' produce a current through the gate of the thryristor 116 which is sufficient to trigger the thyristor 116 when the reed switch 46' is opened due to the magnetic field of a large current. Since the calibration of the control circuit is determined mainly by the circuit components, providing circuit breakers having different ratings involves merely changing the circuit components. This can be accomplished easily if such components are mounted on a plug-in circuit board or module.

Since numerous changes may be made in the above-described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A transformer comprising:
a magnetic core;
a winding assembly inductively coupled to said magnetic core;
a circuit breaker capable of interrupting power supplied by the transformer;
electrical heat sensing means which is responsive to the temperature of said winding assembly;
electrical control means which is responsive to said heat sensing means; and
electromechanical tripping means which trips said circuit breaker when the temperature sensed by said heat sensing means exceeds a first predetermined value, said tripping means being activated by an electrical signal from said control means.

2. The transformer of claim 1 including a current sensing device which is responsive to the current flowing through a winding of the transformer, said current sensing device causing the control means to trip the circuit breaker when said current exceeds a predetermined value.

3. The transformer of claim 1 including overload signal means which is activated by the control means when the temperature sensed by the heat sensing means exceeds a second predetermined value.

4. The transformer of claim 1 wherein the electromechanical tripping means comprises a solenoid which is mechanically connected to a control release mechanism in the circuit breaker and is electrically connected to the electrical control means.

5. The transformer of claim 1 wherein the electrical heat sensing means comprises a temperature responsive variable resistance element located within the winding assembly.

6. The transformer of claim 1 wherein the electrical heat sensing means comprises a temperature responsive variable resistance element located adjacent to a lead carrying the load current, and a heat trap disposed around the resistance element and the lead, said heat trap having substantially the same heat time constant as the winding assembly.

7. The transformer of claim 2 wherein the current sensing device comprises a magnetic reed switch positioned substantially within the magnetic field of a current carrying member which conducts current from the winding assembly.

8. The transformer of claim 3 wherein the overload signal means comprises a lamp which is lighted by the control circuit when the temperature exceeds the second predetermined value.

9. The transformer of claim 3 wherein the control means comprises:
first and second electrical heat sensors;
a first switching circuit which activates the tripping means when the temperature monitored by the first heat sensor exceeds the first predetermined value; and
a second switching circuit which activates the signal means when the temperature monitored by the second heat sensor exceeds the second predetermined value, said second switching circuit being capable of continuing to activate the signal means when the temperature monitored by the second heat sensor decreases below the second predetermined value.

10. The transformer of claim 9 wherein the first switching circuit includes means which permits changing the value of the first predetermined monitored temperature at which the circuit breaker is tripped.

11. The transformer of claim 3 wherein the second predetermined value of temperature is less than the first predetermined value of temperature.

12. A transformer comprising:
a magnetic core;
a winding assembly inductively coupled to said magnetic core;
a circuit breaker electrically connected between said winding assembly and a load;
a first temperaure responsive variable resistance element located within said winding assembly;
a second temperature responsive variable resistance element located within said winding assembly;
an overload signal means which may be activated;
a solenoid which trips said circuit breaker when activated;
a magnetic reed switch located within the magnetic field of the current flowing through said circuit breaker;
a first switching circuit which is responsive to the temperature monitored by said first variable resistant element, said first switching circuit activating said solenoid when the temperature monitored by said first variable resistant element exceeds a first predetermined value, said first switching circuit also activating said solenoid when the magnetic field surrounding said reed switch exceeds a predetermined value;

means for changing the first predetermined value of temperature;

a second switching circuit which is responsive to the temperature monitired by said second variable resistance element, said second switching circuit activating said signal means when the temperature monitiored by said second variable resistant element exceeds a second predetermined value and maintains activation of said signal means when the monitored temperature decreases below the second predetermined value until reset; and means for resetting said second switching circuit.

* * * * *